(12) United States Patent
Roy et al.

(10) Patent No.: US 7,964,321 B2
(45) Date of Patent: Jun. 21, 2011

(54) BIPOLAR PLATE FOR FUEL CELL, COMPRISING SEALING RIBS

(75) Inventors: Francis Roy, Les Ulis (FR); Damien Lemasson, Villeurbanne (FR); Jean-Philippe Poirot-Crouvezier, Saint Georges de Commiers (FR); Patrick Le Gallo, Jarrie (FR)

(73) Assignee: Commissariat A l'Energie Atomique, Paris (FR)

( * ) Notice: Subject to any disclaimer, the term of this patent is extended or adjusted under 35 U.S.C. 154(b) by 673 days.

(21) Appl. No.: 11/993,848

(22) PCT Filed: Jun. 22, 2006

(86) PCT No.: PCT/FR2006/001431
§ 371 (c)(1),
(2), (4) Date: Mar. 20, 2008

(87) PCT Pub. No.: WO2007/003738
PCT Pub. Date: Jan. 11, 2007

(65) Prior Publication Data
US 2009/0042074 A1 Feb. 12, 2009

(30) Foreign Application Priority Data
Jun. 28, 2005 (FR) ..................... 05 06598

(51) Int. Cl.
*H01M 2/14* (2006.01)
(52) U.S. Cl. ........ 429/508; 429/452; 429/453; 429/454; 429/455; 429/456; 429/457; 429/507

(58) Field of Classification Search ................ None
See application file for complete search history.

(56) References Cited

U.S. PATENT DOCUMENTS
6,696,194 B1    2/2004    Hori et al.
(Continued)

FOREIGN PATENT DOCUMENTS
EP    1244166 A    9/2002
(Continued)

OTHER PUBLICATIONS
International Search Report mailed Dec. 21, 2006 in PCT/FR2006/001431.

*Primary Examiner* — Cynthia Lee
(74) *Attorney, Agent, or Firm* — Nicolas E. Seckel

(57) ABSTRACT

The invention relates to a bipolar plate for a fuel cell, of the type that comprises anode and cathode bipolar half plates (1, 1') which are placed next to one another. The central part of each bipolar half plate comprises an active zone (2), while the periphery thereof comprises a plurality of cut-outs (4, 4', 5, 5', 6) which are intended to form at least two oxidant tanks, two fuel tanks and two coolant tanks. Moreover, at least one bipolar half plate comprises at least one connecting rib (8, 8', 10, 12) between a peripheral cut-out and the active zone. Projecting out from the outer face, each coolant tank cut-out is surrounded by a sealing rib (7, 7') and the periphery of each bipolar half plate comprises a rib (15, 15') for sealing the active zone, which connects the coolant tank sealing ribs and which surrounds the oxidant and fuel tanks. Furthermore, each channel formed by a rib segment (15, 15') between two coolant tanks is blocked by a blocking means (17, 17').

14 Claims, 2 Drawing Sheets

U.S. PATENT DOCUMENTS

| | | | |
|---|---|---|---|
| 6,790,552 B2 * | 9/2004 | Kobayashi et al. | 429/469 |
| 2003/0134173 A1 | 7/2003 | Hatoh et al. | |
| 2004/0170882 A1 | 9/2004 | Ohara et al. | |
| 2005/0031933 A1 | 2/2005 | Blunk et al. | |
| 2005/0136306 A1 | 6/2005 | Sugiura et al. | |

FOREIGN PATENT DOCUMENTS

| | | |
|---|---|---|
| EP | 1255315 A | 11/2002 |
| JP | 2000-100452 A | 4/2000 |

* cited by examiner

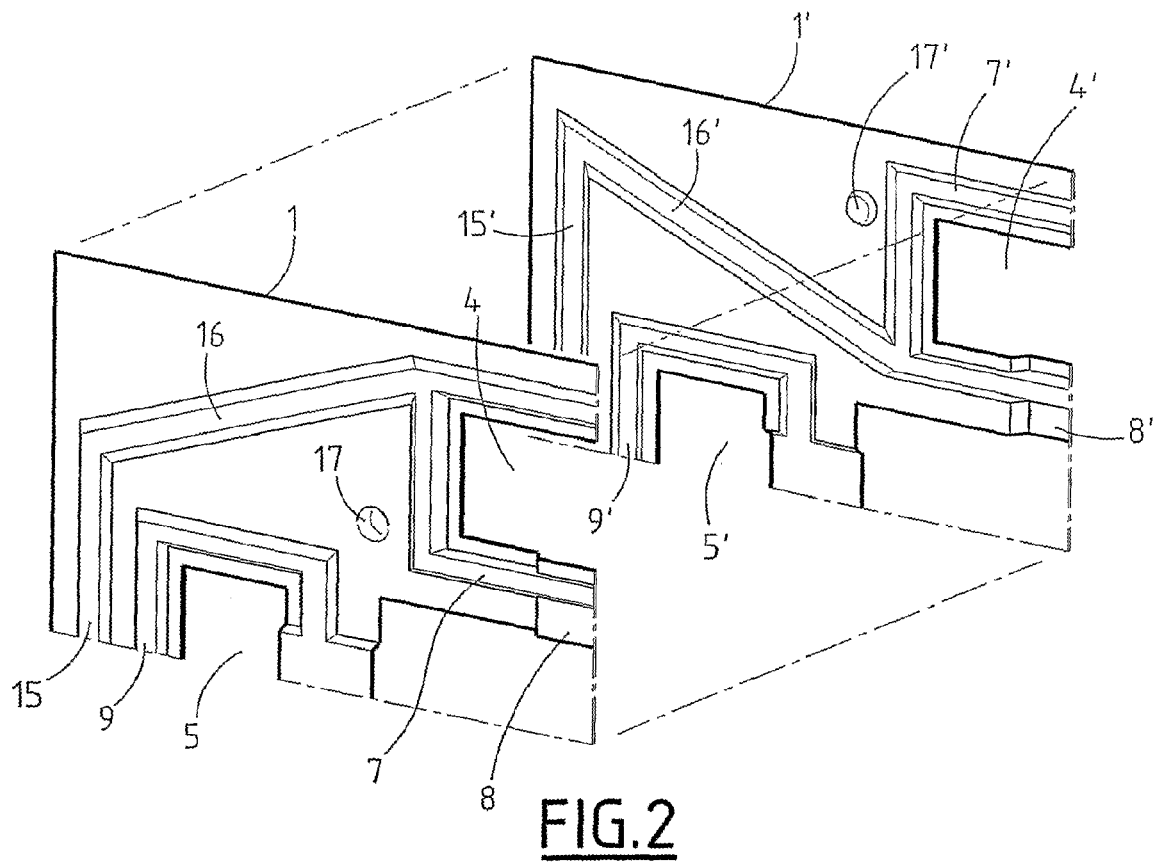
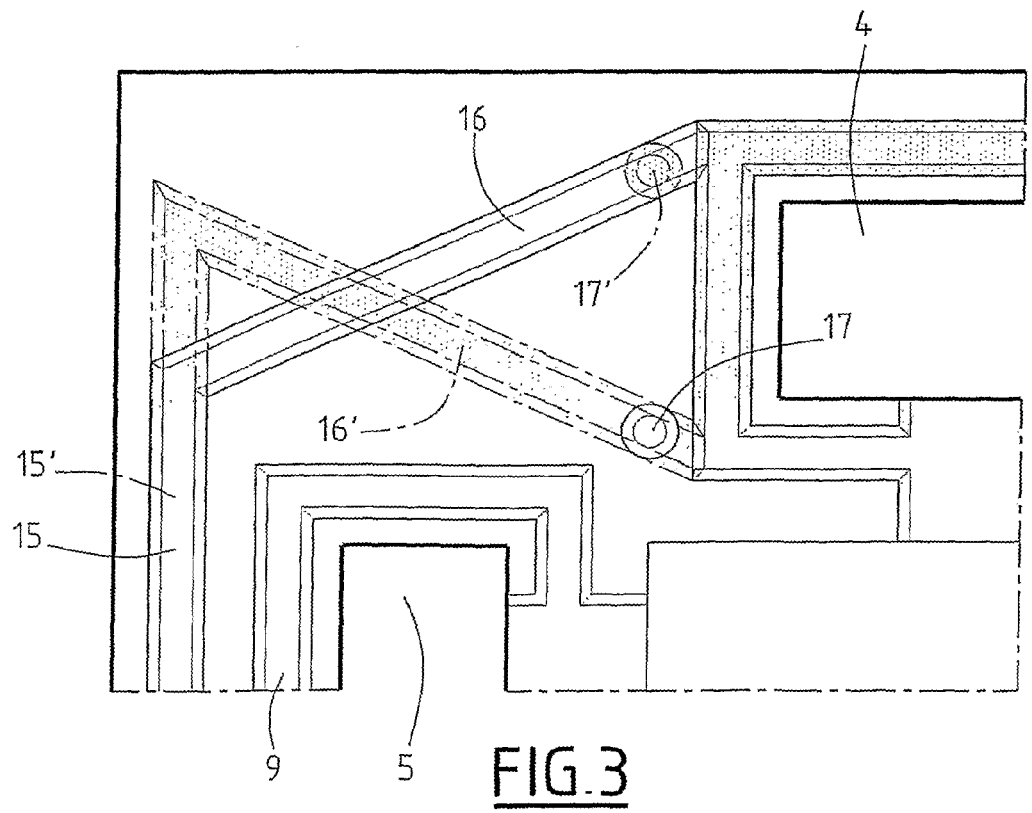

BIPOLAR PLATE FOR FUEL CELL, COMPRISING SEALING RIBS

The present invention relates to a bipolar plate for a fuel cell of the type having a proton-exchange membrane. The bipolar plate is constituted by two bipolar half-plates which are secured to each other, each bipolar half-plate being constituted by a plate which is generally rectangular and which comprises, in the central portion thereof, a network of ribs which constitute the active zone and, at the peripheral portion thereof, a plurality of cut-outs which are intended to constitute fluid units, and ribs which are intended to provide sealing.

A fuel cell having a proton-exchange membrane is a device for producing electricity by means of an electrochemical reaction between a fuel, for example, a gas containing hydrogen, and an oxidant, for example, a gas containing oxygen, separated by a wall which is constituted by a solid electrolyte. In a device of this type, the fuel and the oxidant react in order to form a reaction product, for example, water whilst generating an electrical current which may be used for various applications.

Generally, a fuel cell is constituted by a stack of reactive cells or elementary cells which are each constituted by an electrode/membrane assembly which is inserted between two bipolar plates which comprise channels which are intended for the circulation, on the one hand, of the fuel and, on the other hand, of the oxidant, and finally a cooling heat-exchange fluid such as water. The electrode/membrane assembly is a multi-layer material which is known per se and which comprises a layer which is constituted by the membrane of solid electrolyte which is itself arranged between two active layers which constitute, on the one hand, a cathode and, on the other hand, an anode, which are themselves coated with two outer layers which are referred to as diffusion layers. The stack of elementary cells is retained in a state secured between two terminal plates which are flange-mounted by means of pins which extend from one terminal plate to the other and which extend through the stack of elementary cells.

Generally, bipolar plates are produced from materials which provide good properties in terms of resistance to corrosion and electrical conductivity. Bipolar plates are known, for example, which are produced from carbon-containing materials such as graphite, graphite impregnated with polymer or flexible sheets of graphite, shaped by means of machining or moulding. Bipolar plates are also known which are formed from metal materials, such as alloys based on titanium, aluminium or based on iron and, for example, stainless steel. These bipolar plates which are produced from metal material are generally plates which are shaped by means of drawing or stamping. In bipolar plates which are produced from metal sheets which are shaped by means of drawing, the intake of fluids and the discharge of by-products are carried out in zones of the bipolar plate which are locally planar, which requires the use of a frame which has a suitable shape and which can also be used to provide peripheral sealing of the bipolar plate. This technique has the disadvantage of additionally requiring, for the same bipolar plate, two bipolar half-plates, a complementary component which is intended to provide the joint between the two bipolar half-plates and bring about the supply and discharge of fluid and by-product. Bipolar plates which are relatively solid result.

In particular, one of the reasons for which bipolar plates are relatively large is that it is necessary to provide, on the one hand, seals around each of the fluid collectors and, on the other hand, to provide a seal around the entire periphery of the bipolar plate. It is not possible to use the same rib to provide sealing for both all the supplies or discharges of fluid and the entire periphery of the bipolar plate since this would bring about mixing of the different fluids.

The object of the present invention is to overcome these disadvantages by providing a bipolar plate which is produced from metal plates and which is lighter and more economical than known plates, whilst separating the different fluid circuits.

To this end, the invention relates to a bipolar plate for a fuel cell comprising a cathode bipolar half-plate and an anode bipolar half-plate which are secured to each other, each bipolar half-plate being constituted by a plate which comprises, in the central portion thereof, an active zone and, at the peripheral portion thereof, a plurality of cut-outs which are intended to constitute at least two oxidant fluid units, at least two fuel fluid units and at least two heat-exchange fluid units, at least one bipolar half-plate comprising at least one connection rib between a peripheral cut-out and the active zone. Each cut-out of a bipolar half-plate which is intended to constitute a fluid unit is surrounded by a fluid unit sealing rib which protrudes over the outer face of the bipolar half-plate and each bipolar half-plate comprises, at the periphery thereof, a rib for sealing the active zone which protrudes over the outer face of the bipolar half-plate and which continuously connects the sealing ribs of the heat-exchange fluid units and which surrounds, at the outer side, the oxidant and fuel units, each channel which is constituted by a rib segment between two heat-exchange fluid units being blocked by at least one blocking means.

At least one means for blocking a channel which is formed by a rib between two heat-exchange fluid units is, for example, a pin which protrudes over the inner face of a bipolar half-plate and which is intended to co-operate with the inner side of the sealing rib of the other bipolar half-plate.

Preferably, the ribs for sealing the cooling fluid units and for sealing the active zone of the two bipolar half-plates face each other with the exception of in at least one zone which is located between two ribs for sealing heat-exchange fluid units and, in this zone, at least each bipolar half-plate comprises a pin which protrudes over the inner face thereof and which co-operates with the inner portion of the sealing rib of the active zone of the other bipolar plate in order to block the rib.

At least one bipolar half-plate is, for example, a metal plate in which the ribs and the at least one pin are produced by means of drawing, and at least one bipolar plate which is constituted by a cut and drawn metal plate is composed of stainless steel.

The invention also relates to a cell which is constituted by a membrane/electrode assembly which comprises at least one bipolar plate according to the invention.

The invention will now be described in greater detail but in a non-limiting manner with reference to the appended drawings, in which:

FIG. 2 is an exploded perspective view of a bipolar plate which is constituted by two bipolar half-plates which are secured in the connection zone between a sealing rib and a cut-out of a heat-exchange fluid unit;

FIG. 3 is an enlarged view of a bipolar plate in the connection zone of a sealing rib and a cut-out of a heat-exchange fluid unit.

Figure 1:
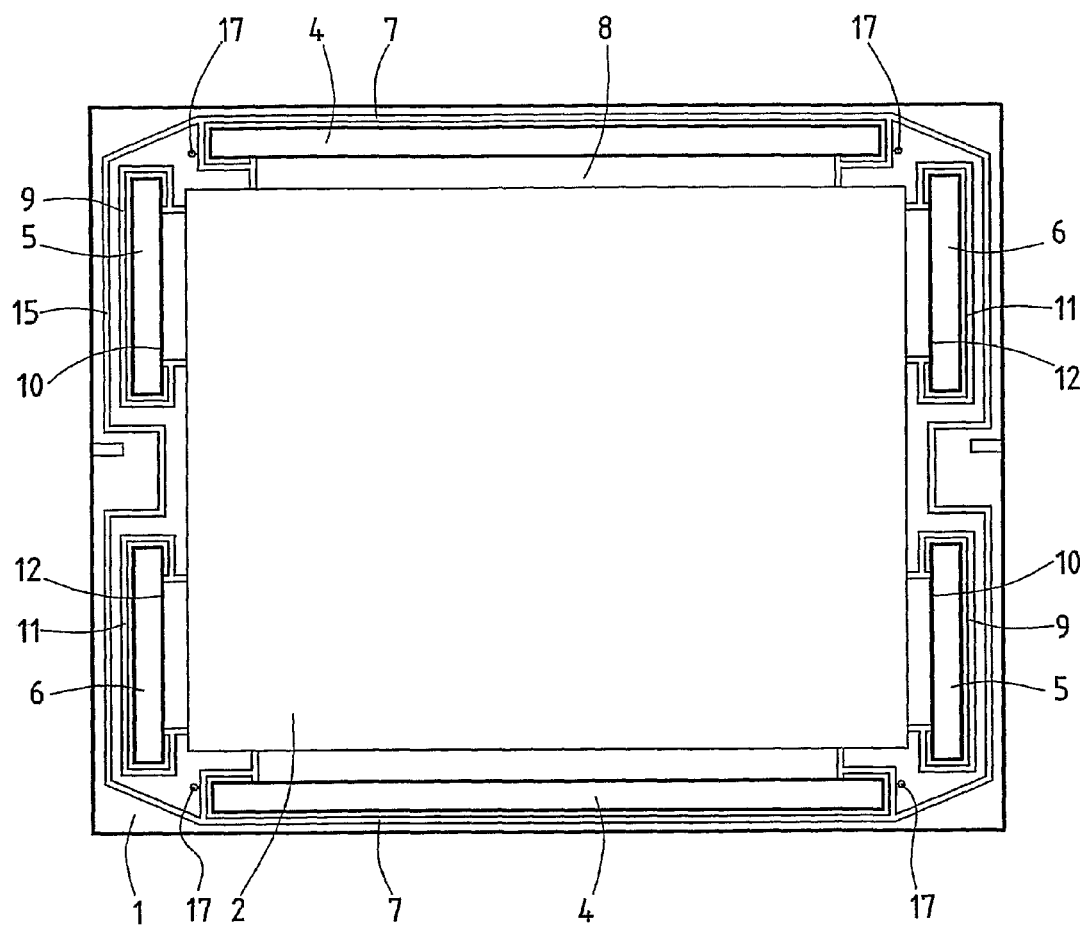
FIG. 1 is a front view of a bipolar plate.

The bipolar plate which is illustrated in FIG. 1 and of which only one face is visible, is constituted by an anode or cathode bipolar half-plate 1 and a bipolar half-plate 1' (partially visible in FIG. 2) which is anode or cathode, respectively, the two half-plates being secured to each other by means of the inner faces thereof. The two half-plates which have shapes which are completely comparable are each constituted by a metal plate, for example, of stainless steel, which is generally rectangular. The central portion 2 of each bipolar half-plate constitutes an active zone which is intended to provide good distribution of the flow of the active fluids on the outer surfaces of each bipolar half-plate and of the heat-exchange fluid between the two bipolar half-plates. At the peripheries thereof, the two bipolar half-plates comprise cut-outs 4, 5, 6 which are generally elongate and which are intended to provide passages for the fluid units for the supply and discharge of the various fluids required for the operation of the cell.

In particular, at the upper portion and the lower portion (as illustrated in the Figure), the bipolar plates comprise cut-outs 4 for the bipolar half-plate 1 and 4' for the bipolar half-plate 1' which are intended to constitute the heat-exchange fluid units. The cut-out of the upper portion is, for example, intended to form the heat-exchange fluid supply unit and the lower cut-out is intended to form the heat-exchange fluid discharge unit. On the two lateral edges, the bipolar half-plates comprise cut-outs 5 and 6 which are also generally elongate and which are intended to form, on the one hand, the supply and discharge units for the oxidant fluid and, on the other hand, supply and discharge units for the fuel fluid.

The cut-outs 4, 4' which are intended to form the heat-exchange fluid units are surrounded by ribs 7, 7' which protrude over the outer surface of each of the bipolar half-plates 1, 1' and which are intended to provide the sealing. On the edge thereof which is directed towards the active zone 2, the cut-outs 4, 4' also comprise ribs 8, 8' which allow communication between the inner side of the heat-exchange fluid units and the space between the two bipolar half-plates 1, 1' facing the active zone 2. The heat-exchange fluid is intended to circulate in the space between the two bipolar half-plates. It must therefore enter via one of the heat-exchange units, then circulate between the two half-plates and finally be discharged via a second heat-exchange fluid unit.

In the same manner, the cut-outs which are intended to form oxidant units 5, 5' or fuel units 6, are surrounded, on the one hand, by ribs 9, 9' and 11 which are intended to provide the sealing, respectively, and, on the other hand, by ribs 10 and 12 which are intended to provide the communication between the supply and discharge units for the fuel or oxidant, and the outer surfaces of the bipolar plate. The oxidant and fuel fluids must circulate between the outer faces of the bipolar plates and the active membranes which are interposed between two successive bipolar plates, the oxidant fluid circulating over the outer face of the cathode bipolar half-plate and the fuel fluid over the outer face of the anode bipolar half-plate.

The ribs which are intended to provide communication between the oxidant or fuel fluid units and the outer faces of the bipolar plates are ribs which, on the one hand, open inside the oxidant or fuel fluid units and, on the other hand, open at the other end via an opening which is provided in the adapted bipolar half-plate, one, corresponding to the oxidant fluid, on the outer face of the cathode bipolar half-plate, and the other, corresponding to the fuel fluid, on the outer face of the anode half-plate.

The sealing of the bipolar plate as a whole is brought about by means of two peripheral ribs which face each other and which protrude over the outer faces of the bipolar plate. One peripheral rib is provided on a bipolar half-plate and the other rib on the other bipolar half-plate. Each peripheral rib comprises segments 15 and 15' which provide the connection between the ribs 7, 7' which surround the cut-outs 4, 4' which are intended to form heat-exchange fluid units. The segments 15, 15' which connect an opening corresponding to an inlet unit of the heat-exchange fluid to an opening which corresponds to an outlet unit of this fluid, pass to the outer side of the sealing ribs 9 and 11 of the cut-outs 5 and 6 which are intended to form oxidant or fuel fluid units.

In the absence of specific arrangements, the segments 15, 15' of the peripheral sealing ribs would provide a direct passage, that is to say, a parasitic bypass, between the sealing ribs 7, 7' of a cut-out 4, 4' of an upper heat-exchange fluid unit and the corresponding sealing ribs of the cut-out of the corresponding lower heat-exchange fluid unit. Owing to the connections between the sealing ribs 7, 7' and the ribs 8, 8' for supplying heat-exchange fluid, this would lead to a parasitic circuit of cooling fluid between the inlet and the outlet without passing via the zone to be cooled.

In order to prevent this parasitic communication between the upper and lower heat-exchange fluid units, there are provided, on the segments of the peripheral sealing ribs 15 of the bipolar half-plate 1, zones for connection between the sealing ribs 7 which surround the cut-out 4 of the heat-exchange fluid unit, the connections 16 which extend, for example, outwards and which are each complemented by a pin 17 which protrudes over the inner face of the bipolar half-plate 1.

In the same manner on the bipolar half-plate 1' which comprises two peripheral sealing ribs 15' which face the peripheral rib segments 15 of the bipolar half-plate 1, there are provided, in the region of the sealing ribs 7' which surround the cut-outs 4' which are intended to form heat-exchange fluid units, connection zones 16' which are directed inwards so that, when the two bipolar half-plates are secured, each pin 17 of the bipolar half-plate 1 blocks the corresponding portion 16' of a peripheral rib segment 15'.

In the same manner on the half-plate 1' there are provided pins 17' which protrude towards the inner face of the bipolar half-plate 1' and which are arranged in such a manner that, when the two bipolar half-plates are secured to each other, each pin blocks the corresponding portion 16 of a peripheral sealing rib segment 15.

In this manner, with peripheral sealing rib segments 15 and 15' in continuity with the peripheral sealing ribs 7, 7' of the cut-outs 4, 4' which are intended to form cooling fluid units, the spatial requirement of the bipolar plate is reduced and, owing to the arrangement of the pins 17 and 17' which block the peripheral sealing ribs 15 and 15', the creation of a bypass between the inlet units for cooling fluid and the discharge units for cooling fluid is prevented.

The means for obstructing or blocking the bypass as described is not limiting and other comparable arrangements may be envisaged which allow a bypass to be prevented between the units for supplying cooling fluid and the units for discharging cooling fluid. This means may, for example, be a stopper of polymer material which has a suitable shape and which is inserted locally in the rib and which is sufficiently large to be squeezed between the two bipolar half-plates. These stoppers may be held in place by points of adhesive.

The invention claimed is:

1. Bipolar plate for a fuel cell, comprising:
   a cathode bipolar half-plate and an anode bipolar half-plate which are secured to each other,
   each of said bipolar half-plates having an inner face facing toward the other of said bipolar half-plates and an outer face facing away from the other of said bipolar half-plates,
   each of said bipolar half-plates being constituted by a respective plate which comprises, in a central portion thereof, an active zone and, in a peripheral portion thereof, at least six cut-outs which are intended to constitute at least two oxidant units, at least two fuel units and at least two heat-exchange fluid units, respectively, at least one of the bipolar half-plates comprising at least one connection rib between one of the cut-outs and the active zone, wherein each of said cut-outs of each of said bipolar half-plates is surrounded by a respective fluid unit sealing rib for sealing the respective fluid unit, wherein the fluid unit sealing rib protrudes over the outer face of the bipolar half-plate, wherein each of said bipolar half-plates comprises, in the peripheral portion thereof, an active zone sealing rib for sealing the active zone, wherein the active zone sealing rib protrudes over the outer face of the bipolar half-plate, continuously connects the sealing ribs of the heat-exchange fluid units, and surrounds the sealing ribs for sealing the oxidant and fuel units at an outer side thereof, wherein said active zone sealing rib comprises at least two rib segments, wherein each of said rib segments continuously connects two of the sealing ribs for sealing the heat-exchange fluid units, respectively, wherein each of said rib segments forms a channel on the inner face of the bipolar half-plate, and wherein each of said channels is blocked by a channel blocking means.

2. Bipolar plate for a fuel cell according to claim 1, wherein at least one of said channel blocking means which blocks one of the channels of one of the bipolar half-plates is constituted by a pin which protrudes over the inner face of that bipolar half-plate and which also blocks one of the channels of the other of said bipolar half-plates.

3. Bipolar plate for a fuel cell according to claim 2, wherein the sealing ribs for sealing the heat-exchange fluid units and the active zone sealing rib for sealing the active zone of one of the bipolar half-plates are located in regard with respect to the corresponding sealing ribs of the other of the bipolar half-plates except in at least one zone which is located between the sealing rib for sealing one of the heat-exchange fluid units, which is an inlet unit, and the sealing rib for sealing another of the heat-exchange fluid units, which is an outlet unit, of each of the bipolar half-plates, and, in this zone, each of the bipolar half-plates comprises a respective pin which protrudes over the inner face thereof and which blocks one of the channels of the active zone sealing rib of the other of the bipolar half-plates.

4. Bipolar plate according to claim 2, wherein at least one of the bipolar half-plates is a metal plate in which the ribs and the at least one pin are produced by means of drawing.

5. Bipolar plate according to claim 4, wherein the at least one of the bipolar half-plates is a cut and drawn metal plate composed of stainless steel.

6. Fuel cell comprising at least one cell which is constituted by a membrane/electrode assembly which comprises at least one bipolar plate according to claim 1.

7. Bipolar plate according to claim 3, wherein at least one of the bipolar half-plates is a metal plate in which the ribs and the at least one pin are produced by means of drawing.

8. Bipolar plate according to claim 7, wherein at least one bipolar half-plate which is constituted by a cut and drawn metal plate is composed of stainless steel.

9. Fuel cell comprising at least one cell which is constituted by a membrane/electrode assembly which comprises at least one bipolar plate according to claim 2.

10. Fuel cell comprising at least one cell which is constituted by a membrane/electrode assembly which comprises at least one bipolar plate according to claim 3.

11. Fuel cell comprising at least one cell which is constituted by a membrane/electrode assembly which comprises at least one bipolar plate according to claim 4.

12. Fuel cell comprising at least one cell which is constituted by a membrane/electrode assembly which comprises at least one bipolar plate according to claim 5.

13. Fuel cell comprising at least one cell which is constituted by a membrane/electrode assembly which comprises at least one bipolar plate according to claim 7.

14. Fuel cell comprising at least one cell which is constituted by a membrane/electrode assembly which comprises at least one bipolar plate according to claim 8.

* * * * *

UNITED STATES PATENT AND TRADEMARK OFFICE
CERTIFICATE OF CORRECTION

| | | |
|---|---|---|
| PATENT NO. | : 7,964,321 B2 | Page 1 of 1 |
| APPLICATION NO. | : 11/993848 | |
| DATED | : June 21, 2011 | |
| INVENTOR(S) | : Roy et al. | |

It is certified that error appears in the above-identified patent and that said Letters Patent is hereby corrected as shown below:

On the Title Page:

Item (73);  Assignee;

After the first Assignee, insert the second Assignee;

-- Peugeot Citroen Automobiles SA, Velizy Villacoublay (FR) --

Signed and Sealed this
Twenty-fourth Day of July, 2012

David J. Kappos
*Director of the United States Patent and Trademark Office*